(12) United States Patent
Fischer et al.

(10) Patent No.: US 7,832,751 B2
(45) Date of Patent: Nov. 16, 2010

(54) REAR FENDER ASSEMBLY

(75) Inventors: Mark T. Fischer, Milwaukee, WI (US); John S. Cullen, Mequon, WI (US); Ronald G. Hurth, Beaver Dam, WI (US); Santiago Mendoza, Jr., York, PA (US); Jason A. Franklin, White Hall, MD (US); James A. Wollmer, Menomonee Falls, WI (US); Gregory R. Winsor, Waukesha, WI (US); Douglas D. Clarkson, Colgate, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 471 days.

(21) Appl. No.: 11/771,341

(22) Filed: Jun. 29, 2007

(65) Prior Publication Data

US 2009/0001705 A1    Jan. 1, 2009

(51) Int. Cl.
   B62D 25/16    (2006.01)
(52) U.S. Cl. .................. 280/154; 280/160; 280/848; 280/854
(58) Field of Classification Search ............. 280/152.1, 280/152.2, 154, 160, 160.1, 854, 847–848, 280/850, 782, 288–288.4; 296/198, 280
   See application file for complete search history.

(56) References Cited

U.S. PATENT DOCUMENTS

| D27,068 S | 5/1897 | Noyes |
|---|---|---|
| D27,069 S | 5/1897 | Noyes |
| 583,313 A | 5/1897 | Taylor et al. |
| 655,316 A | 8/1900 | Welch |
| 1,506,270 A | 8/1924 | Pullin |
| 1,713,405 A * | 5/1929 | Stansfeld .......... 280/847 |
| D117,796 S | 11/1939 | Morgan |
| D157,627 S | 3/1950 | Russell |
| D157,628 S | 3/1950 | Russell |
| D157,629 S | 3/1950 | Russell |

(Continued)

FOREIGN PATENT DOCUMENTS

JP    403235773 A    10/1991

(Continued)

OTHER PUBLICATIONS

Custom Chrome, Inc., Custom Chrome 1989 Catalog, pp. 234-235, Morgan Hill, California.

(Continued)

*Primary Examiner*—Glenn Dayoan
*Assistant Examiner*—Erez Gurari
(74) *Attorney, Agent, or Firm*—Michael Best & Friedrich LLP

(57) ABSTRACT

A rear fender assembly for a vehicle is provided. The rear fender assembly has an outer fender having an inner surface, an inner fender having an outer surface connected with the inner surface of the outer fender, and an upper bracket sandwiched between the inner surface of the outer fender and the outer surface of the inner fender. The upper bracket has an outer surface connected with the inner surface of the outer fender. The upper bracket forms an upper protrusion which extends from the outer surface of the upper bracket through a first opening defined by the outer fender.

14 Claims, 14 Drawing Sheets

U.S. PATENT DOCUMENTS

| | | | |
|---|---|---|---|
| D157,630 S | 3/1950 | Russell | |
| 2,525,595 A | 10/1950 | Fergueson | |
| 3,939,730 A | 2/1976 | DeHaan | |
| 4,158,402 A | 6/1979 | Romans | |
| 4,366,880 A | 1/1983 | Miller et al. | |
| 4,605,238 A * | 8/1986 | Arenhold | 280/851 |
| 4,815,555 A * | 3/1989 | Kishi et al. | 180/227 |
| 5,238,268 A * | 8/1993 | Logan | 280/848 |
| 5,299,832 A | 4/1994 | Price, Sr. | |
| 5,879,045 A * | 3/1999 | Logan | 296/136.07 |
| 7,036,837 B1 * | 5/2006 | Bauer et al. | 280/288.4 |
| 7,234,559 B2 * | 6/2007 | Nakano et al. | 180/219 |
| 2003/0121708 A1 * | 7/2003 | Laivins et al. | 180/229 |
| 2005/0039967 A1 * | 2/2005 | Aube et al. | 180/312 |
| 2005/0087949 A1 * | 4/2005 | Presby | 280/152.1 |
| 2005/0122729 A1 * | 6/2005 | Katagiri | 362/475 |
| 2006/0000652 A1 * | 1/2006 | Yamaguchi et al. | 180/68.3 |
| 2006/0283647 A1 * | 12/2006 | Seki et al. | 180/219 |
| 2007/0152423 A1 | 7/2007 | Waters | |
| 2009/0001753 A1 | 1/2009 | Clarkson et al. | |

FOREIGN PATENT DOCUMENTS

| | | |
|---|---|---|
| JP | 405238452 A | 9/1993 |
| JP | 405254468 A | 10/1993 |

OTHER PUBLICATIONS

Custom Chrome, Inc., Custom Chrome 1992 Catalog, pp. 446-451, Morgan Hill, California.

* cited by examiner

REAR FENDER ASSEMBLY

BACKGROUND

The present invention relates to a rear fender assembly for a vehicle, and more particularly a rear fender assembly having a rigid structure for a motorcycle.

SUMMARY

According to one aspect of the present invention, a rear fender assembly for a vehicle is provided. The rear fender assembly has an outer fender having an inner surface, an inner fender having an outer surface connected with the inner surface of the outer fender, and an upper bracket sandwiched between the inner surface of the outer fender and the outer surface of the inner fender. The upper bracket has an outer surface connected with the inner surface of the outer fender. The upper bracket forms an upper protrusion which extends from the outer surface of the upper bracket through a first opening defined by the outer fender.

Figure 1:
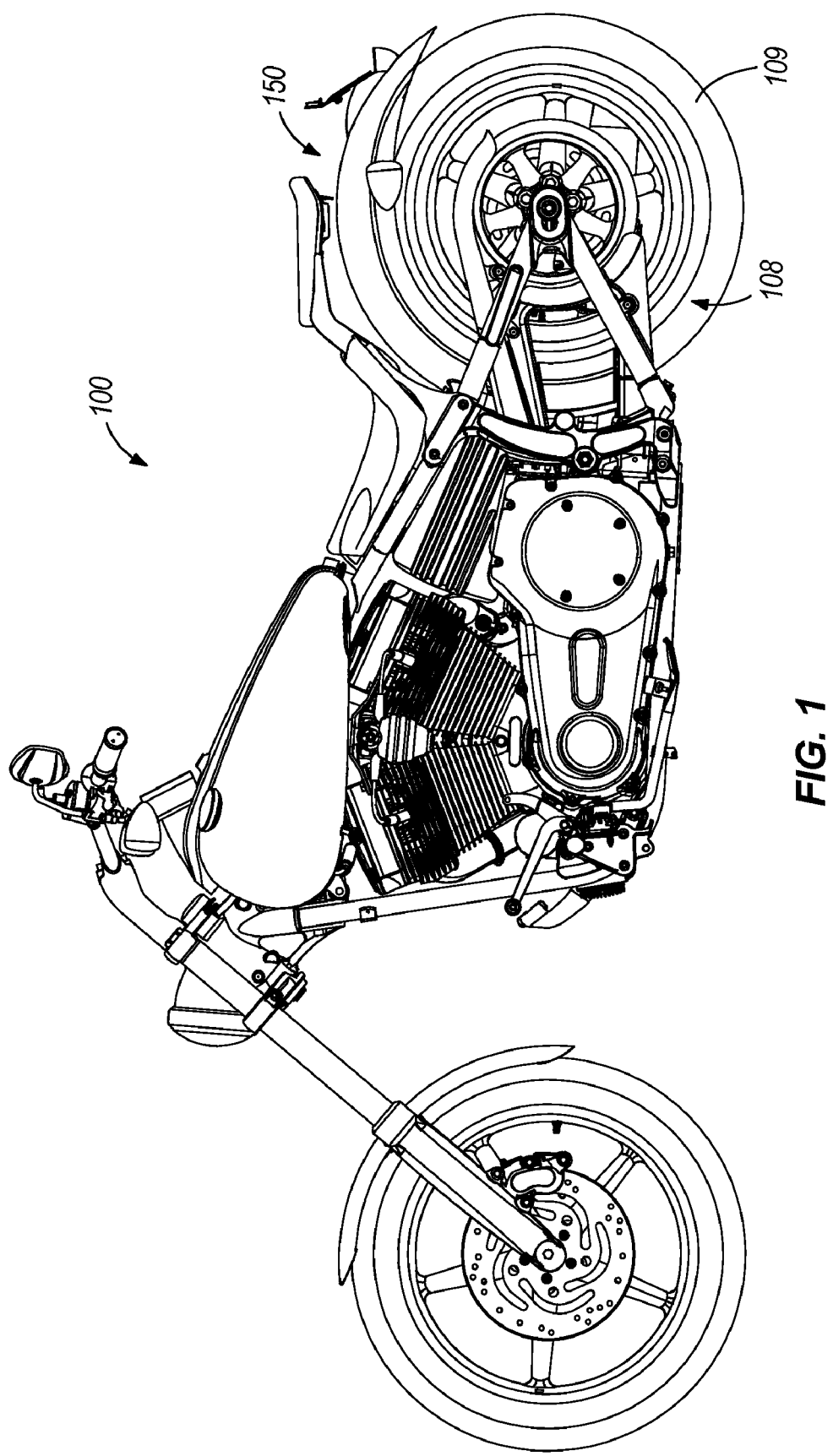
FIG. 1 is a side view of motorcycle, in accordance with one embodiment of the present invention.

It should be appreciated that for simplicity and clarity of illustration, elements shown in the Figures have not necessarily been drawn to scale. For example, the dimensions of some elements may be exaggerated relative to each other for clarity. Further, where considered appropriate, reference numerals have been repeated among the Figures to indicate corresponding elements.

DETAILED DESCRIPTION

Figure 7:
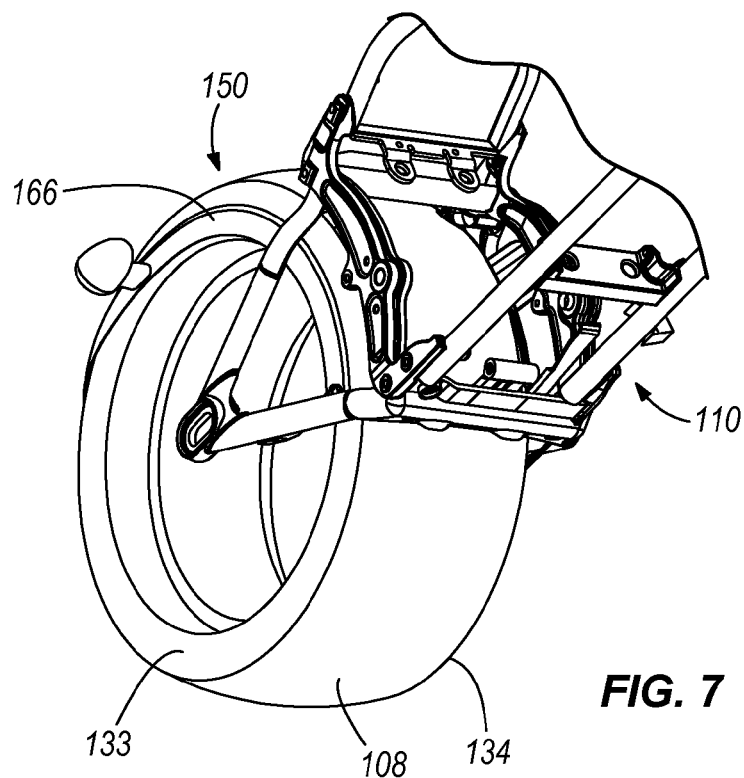
FIG. 7 is a first perspective view of the rear fender assembly attached to a swing arm assembly of the vehicle.
Figure 8:
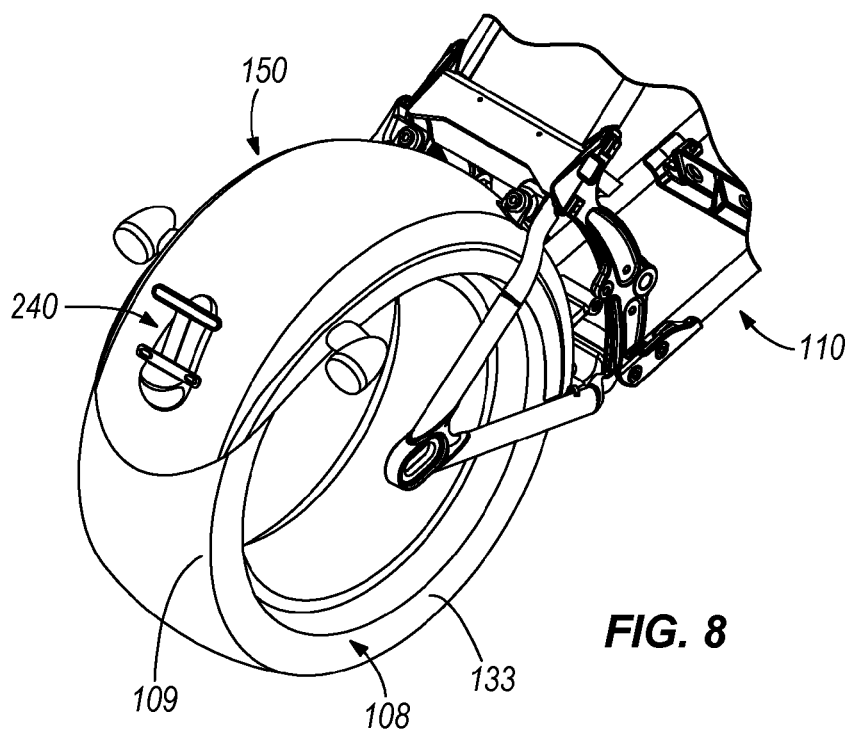
FIG. 8 is a second perspective view of the rear fender assembly attached to the swing arm assembly.

Shown FIGS. 1-6 is a rear fender assembly 150 for a motorcycle 100. The rear fender assembly 150 covers at least a portion of a rear wheel 108 of the motorcycle 100, as shown in FIGS. 7 and 8. The rear fender assembly 150 is shaped and formed around at least a portion of exposed tire 109 of the rear wheel 108.

As shown in FIGS. 2-6, the rear fender assembly 150 includes an outer fender 152, an inner fender 170 connected with the outer fender 152, and upper left, upper right, and lower brackets 200, 206, 220 sandwiched between the outer fender 152 and the inner fender 170. The outer fender 152 has a generally U-shaped cross-section which curves around and covers at least a portion of right and left tire walls 133,134 of the exposed tire 109, as shown in FIGS. 7 and 8. Preferably the U-shaped cross-section is tightly matched to the shape and contour of the tire 109 so that the outer fender 152 is no more than between 1 to 5 cm away from the tire 109 and preferably no more than 1 to 3 cm from the tire 109. Preferably, the outer fender 152 is manufactured from a metal, such as steel, iron, stainless steel, chrome, nickel, aluminum, titanium, or a compound of metals. The outer fender 152 is preferably formed by stamping out, bending and curving metal sheets.

Figure 2:
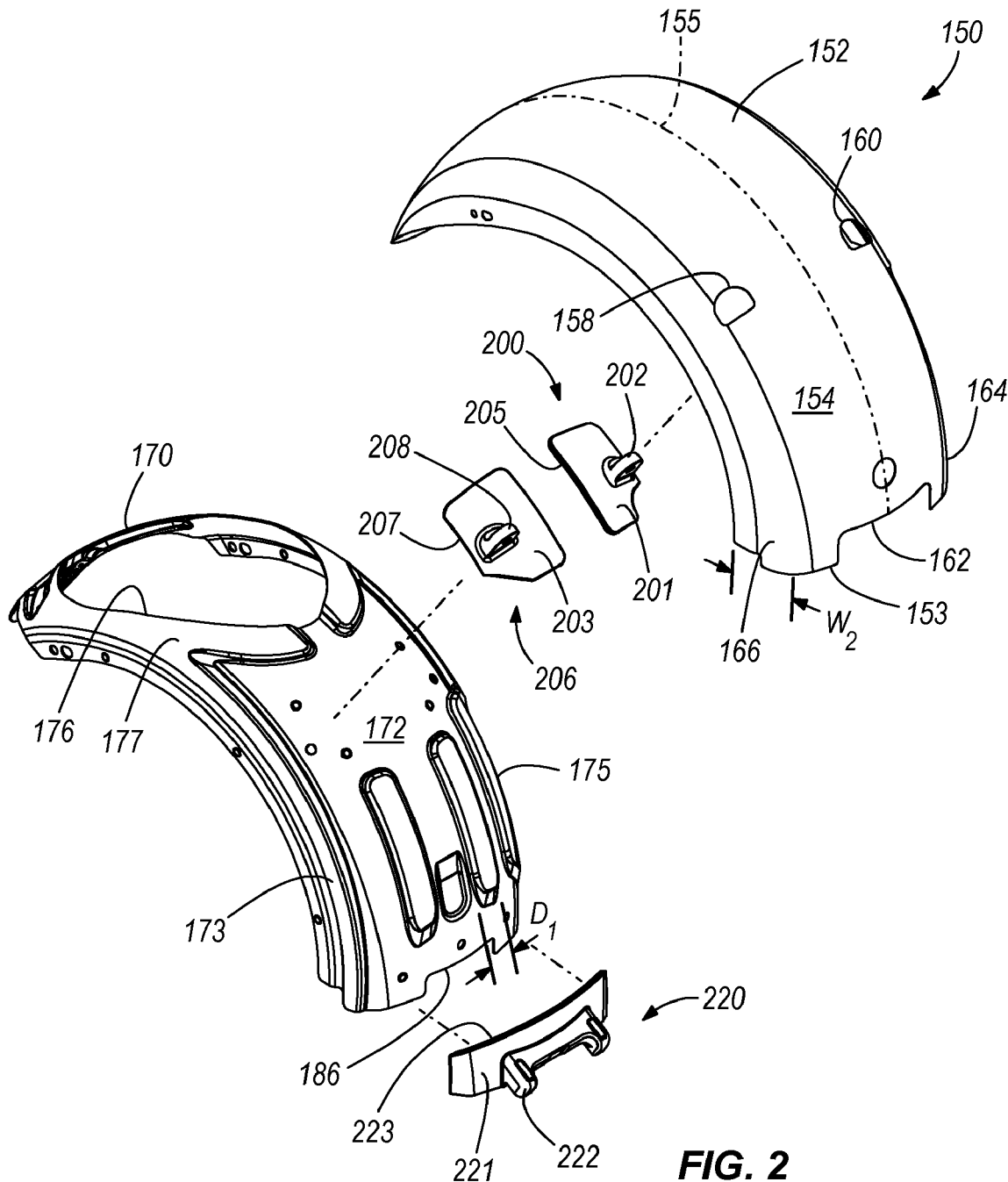
FIG. 2 is an exploded view of a rear fender assembly for the vehicle of FIG. 1.
Figure 3:
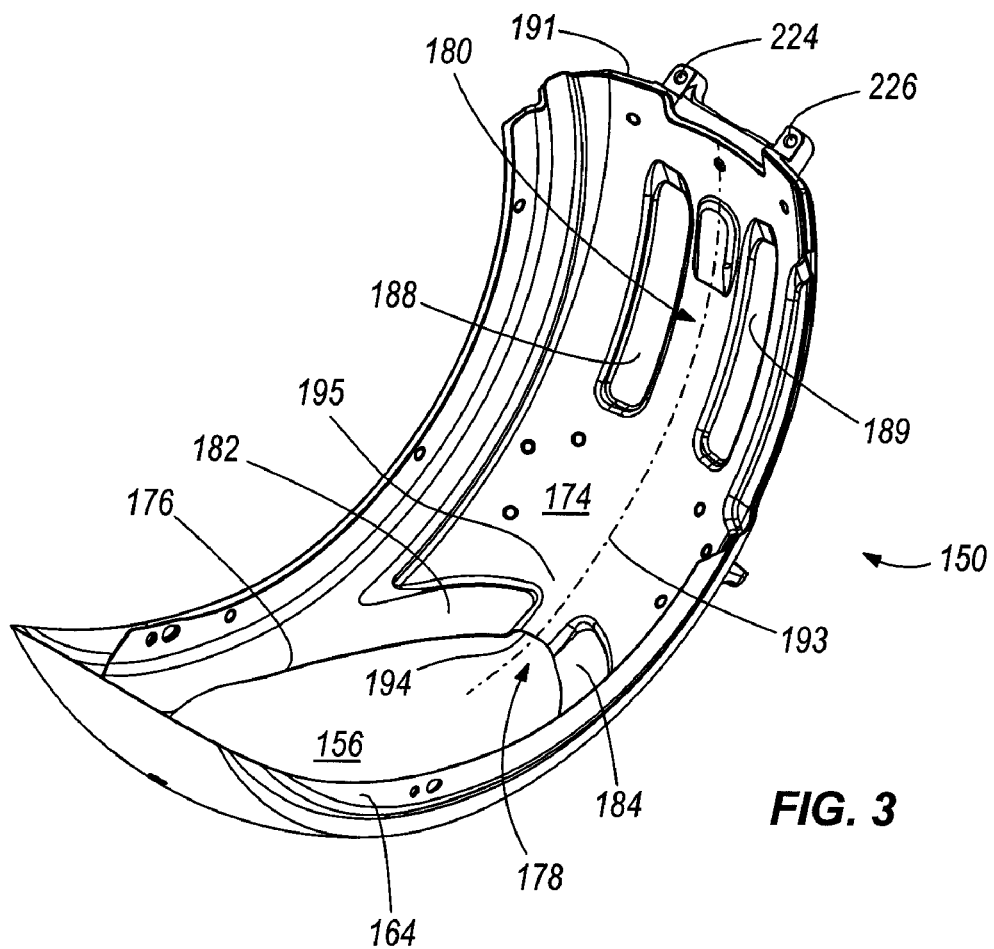
FIG. 3 is a bottom perspective view of the rear fender assembly of FIG. 2.

The outer fender 152 forms a right side ridge 166 along the right tire wall 133 of the outer fender 152 and a left side ridge 164 along a left side of the outer fender 152 as shown in FIGS. 2 and 3. The right and left side ridges 166,164 are arc-shaped and help to add rigidity to the structure of the outer fender 152. The outer fender 152 includes an outer surface 154 opposed to an inner surface 156, as shown in FIGS. 2 and 3. Preferably the outer surface 154 is polished to a shine finish or coated with chrome or paint so as to enhance the appearance of the outer fender 152.

When forming the outer fender 152, openings 158 and 160 are formed in the outer fender 152, as shown in FIG. 2, to allow for protrusions 202, 208 of the upper left and upper right brackets 200, 206 to project through, as shown in FIG. 2. Additionally, a lower U-shaped opening or slot 162 is formed along a bottom end of the outer fender 152 for allowing a U-shaped protrusion 222 of the lower bracket 220 to project through.

As shown in FIG. 2, a top edge 155 of the outer fender 152 follows an arc of a circle which measures at least 120 degrees and preferably between 100 and 180 degrees. In the illustrated embodiment, the arc measures approximately 180 degrees. In this manner the rear fender assembly 150 curves around and generally hugs a significant portion of the rear wheel 108 and the tire 109, as shown in FIGS. 7 and 8.

The inner fender 170 also has a generally U-shaped cross-section which curves around and covers at least a portion of right and left tire walls 133,134 of the exposed tire 109, and is designed to allow the inner fender 170 to mate with the outer fender 152. Preferably, the inner fender 170 is manufactured from a metal, such as steel, iron, stainless steel, chrome, nickel, aluminum, titanium, or a compound of metals. The inner fender 170 is preferably formed by stamping out, bending and curving metal sheets.

The inner fender 170 also forms right and left side ridges 173, 175 to mate with the right and left side ridges 166, 164 of the outer fender 152. The right and left side ridges 173, 175 help to add additional rigidity to the structure of the inner fender 170. The inner fender 170 includes an outer surface 172 opposed to an inner surface 174, as shown in FIGS. 2 and 3. The outer surface 172 mates with and is connected to the inner surface 156 of the outer fender. In the illustrated embodiment, the outer surface 172 is connected with and bonded to the inner surface 156 using a heat-cured adhesive, however the outer surface 172 may be connected with the inner surface 156 in one of a number of ways, such as by using: mechanical fasteners such as screws, bolts, rivets, and solder; chemical fasteners or other types of glue or epoxy; or by welding.

The inner fender 170 forms a large opening 176 at a top side 177 of the inner fender 170, as shown in FIGS. 2 and 3. The opening 176 is formed to reduce the amount of material required to manufacture the inner fender 170 which in turn reduces the overall weight of the rear fender assembly 150. The opening 176 may be formed by stamping out a section of metal from the inner fender 170. A series of stiffening protrusions 188, 189, 182, 184 are formed or stamped into the inner fender 170 to provide increased structural rigidity for the inner fender 170. The stiffening protrusions 188, 189, 182, 184 protrude a distance $D_1$ of approximately between 2 and 15 mm from the outer surface 172. The stiffening protrusions 188, 189, 182, 184 also form a transition ramp 178 and a wiring routing surface 180 between the inner fender 170 and the outer fender 152. The transition ramp 178 and the wiring routing surface 180 allow for a smooth wiring routing path 193 for routing wires (not shown) on the inner surface 174 from a bottom end 191 of the inner fender 172 to the inner surface 156 of the outer fender 152, as shown in FIG. 3.

Figure 15:
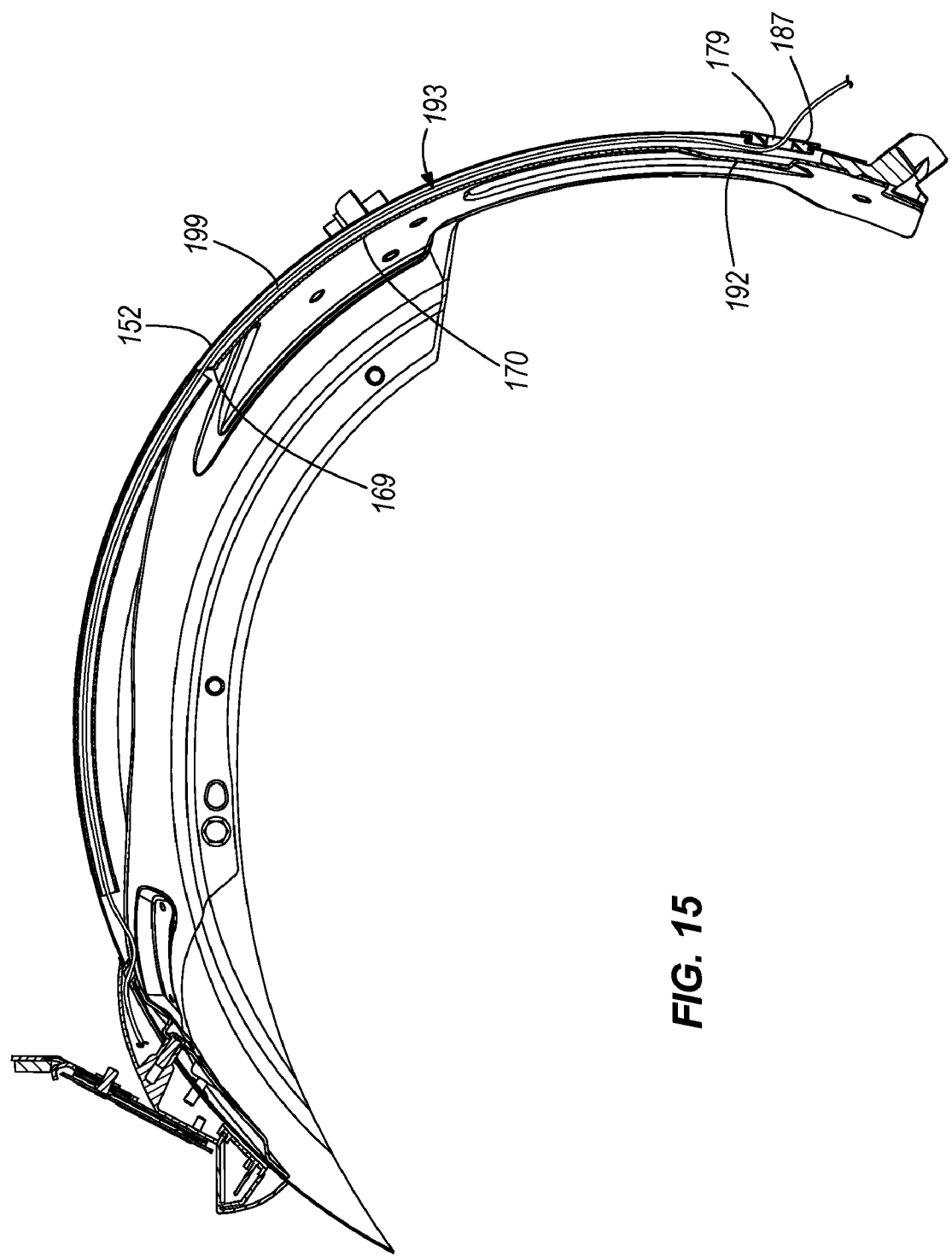
FIG. 15 is a cross-section view of a fender assembly according to another embodiment of the invention.

The transition ramp 178 is formed between the pair of stiffening protrusions 182, 184. A first end 194 of the transition ramp 178 is formed along an edge of the opening 176 at a first distance from the inner surface 156 of the outer fender 152. A second end 195 of the transition ramp 178 is formed away from the edge of the opening 176 at a second distance from the inner surface 156 of the outer fender 152. The first distance is less than the second distance. In some embodiments, the first distance is less than 2 mm, and in other embodiments the first end 194 contacts the inner surface 156. In other constructions of the inner fender 170, such as the one illustrated in FIG. 15, the ramp 178 is eliminated and an aperture 169 is disposed in the same general location. The aperture 169 serves as an exit point for the wires 199. The outer fender 152 can include an aperture 179 serving as an entrance point for the wires 199 located in the wire path 193. A grommet 187 lines the aperture to cushion the wires 199 entering the wire path 193 and a detent 192 is formed on the inner fender 170 to allow clearance for the wires 199 to enter the wire path 193.

The upper brackets 200, 206 are sandwiched between the outer fender 152 and the inner fender 170. The upper brackets 200, 206 can be manufactured from a metal, such as steel, iron, stainless steel, chrome, nickel, aluminum, titanium, or a compound of metals. A bottom surface 205, 207 of each upper bracket 200, 206 is fixedly connected with the outer surface 172 of the inner fender 170 and a top surface 201, 203 of each upper bracket 200, 206 is fixedly connected with the inner surface 156 of the outer fender 152. The upper brackets 200, 206 are connected with and bonded to both the outer surface 172 and the inner surface 156 using a heat-cured adhesive. However, the upper brackets 200, 206 can be connected with the outer surface 172 and the inner surface 156 in one of a number of ways, such as by using: mechanical fasteners such as screws, bolts, rivets, and solder; chemical fasteners or other types of glue or epoxy; or by welding.

Figure 5:
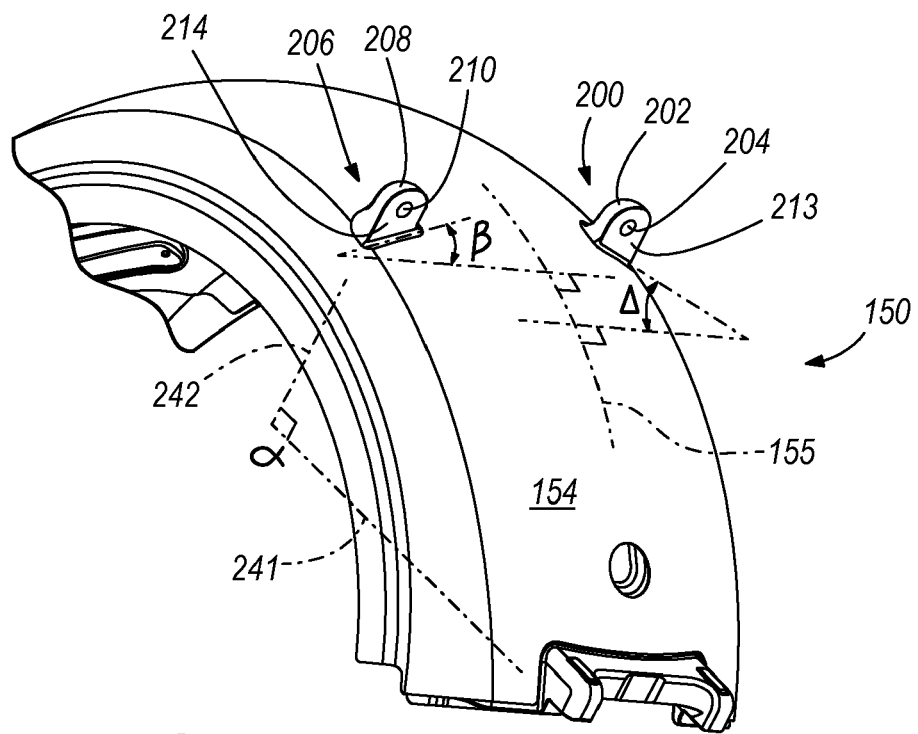
FIG. 5 is an enlarged perspective view of the rear fender assembly of FIG. 2.
Figure 6:
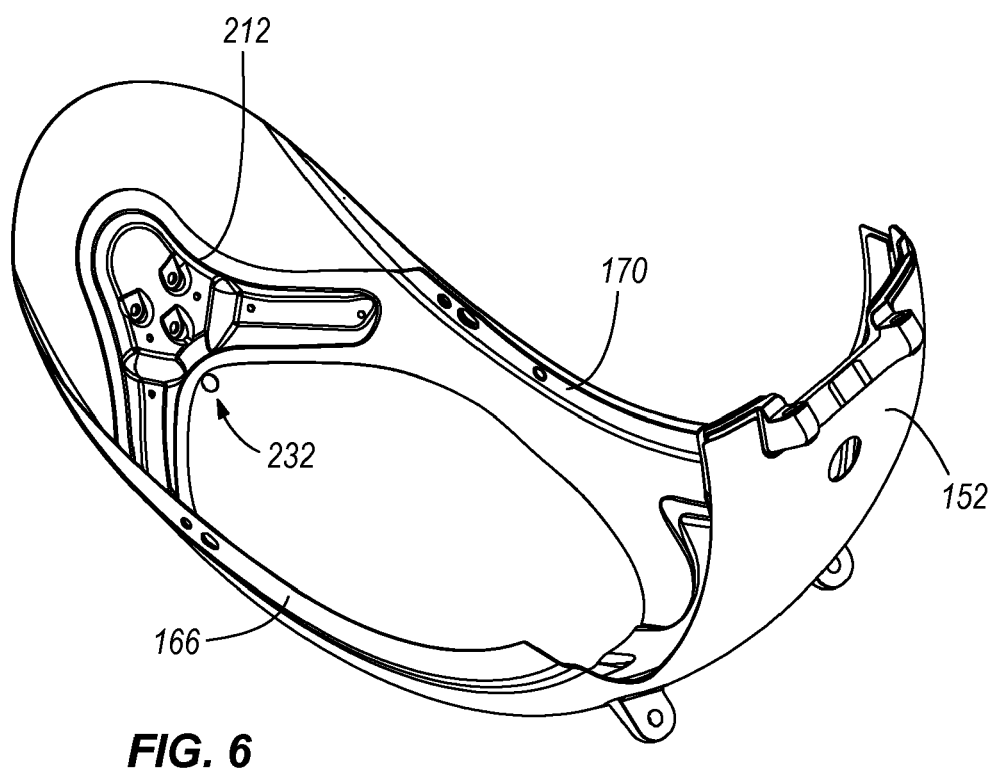
FIG. 6 is a third bottom perspective view of the rear fender assembly of FIG. 2.

The upper brackets 200, 206 form protrusions 202, 208 that extend through openings 160, 158, respectively, as shown in FIGS. 2 and 5. Each protrusion 202, 208 is fixedly connected with a corresponding protrusion 136, 137 formed on the swing arm assembly 110 (see FIGS. 9 and 10). Preferably, each protrusion 202, 208 forms an opening 204, 210, respectively, for receiving a fastener 126, 124 which is also placed through respective openings formed in the protrusion 136, 137. The fasteners 126, 124 preferably are mechanical fasteners such as screws, bolts, rivets, and solder. Each protrusion 202, 208 has a front surface 213, 214 that intersects the respective top surface 201, 203 of each protrusion 202, 208 at respective angles $\Delta$, $\beta$, as shown in FIG. 5. Angles $\Delta$, $\beta$ are formed between the intersection of the front surface 213, 214 and the top surface 201, 203 and between a line which is generally perpendicular to the top edge 155, as shown in FIG. 5. Preferably, angles $\Delta$, $\beta$ are between 5 and 80 degrees, and more preferably between 10 and 40 degrees.

The lower bracket 220 is sandwiched between the outer fender 152 and the inner fender 170. The lower bracket 220 can be manufactured from a metal, such as steel, iron, stainless steel, chrome, nickel, aluminum, titanium, or a compound of metals. A bottom surface 223 of the lower bracket 220 is fixedly connected with the outer surface 172 of the inner fender 170 and a top surface 221 of the lower bracket 220 is fixedly connected with the inner surface 156 of the outer fender 152. The lower bracket 220 is connected with and bonded to both the outer surface 172 and the inner surface 156 using a heat-cured adhesive. However, the lower bracket 220 can be connected with the outer surface 172 and the inner surface 156 in one of a number of ways, such as by using: mechanical fasteners such as screws, bolts, rivets, and solder; chemical fasteners or other types of glue or epoxy; or by welding.

The lower bracket 220 forms a U-shaped protrusion 222 that extends through the lower slot 162 formed in the outer fender 152, as shown in FIGS. 2 and 5. The U-shaped protrusion 222 is fixedly connected with corresponding protrusions 139, 140 formed on the swing arm assembly 110 (see FIGS. 9 and 10). Preferably, the U-shaped protrusion 222 forms two opening 224, 226, respectively, for receiving fasteners (not shown) which are also placed through respective openings formed in the protrusions 139, 140. The fasteners preferably are mechanical fasteners such as screws, bolts, rivets, and solder.

Figure 4:
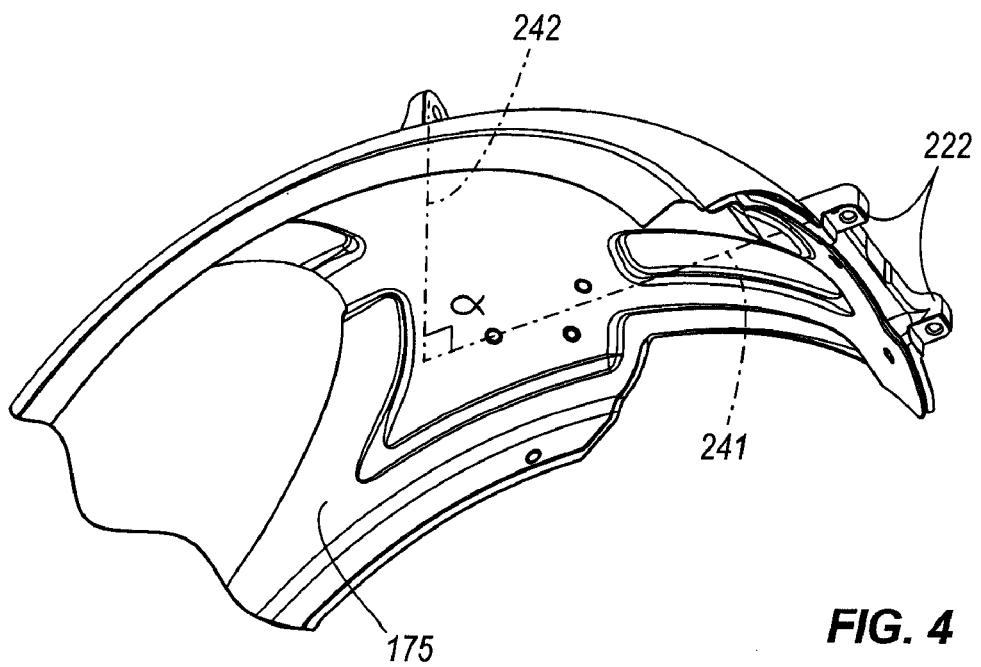
FIG. 4 is a second bottom perspective view of the rear fender assembly of FIG. 2.

The upper brackets 200, 206 extend through the openings 160, 158 in a first direction along a first line 242, as shown in FIGS. 4 and 5, and the lower bracket extends through the lower slot 162 in a second direction along a second line 241. Preferably, the angle $\alpha$ between the first and second lines 242, 241 (defined by the faces 224, 226 and faces 213, 214) is between 80 and 100 degrees, and more preferably about 90 degrees.

Figure 9:
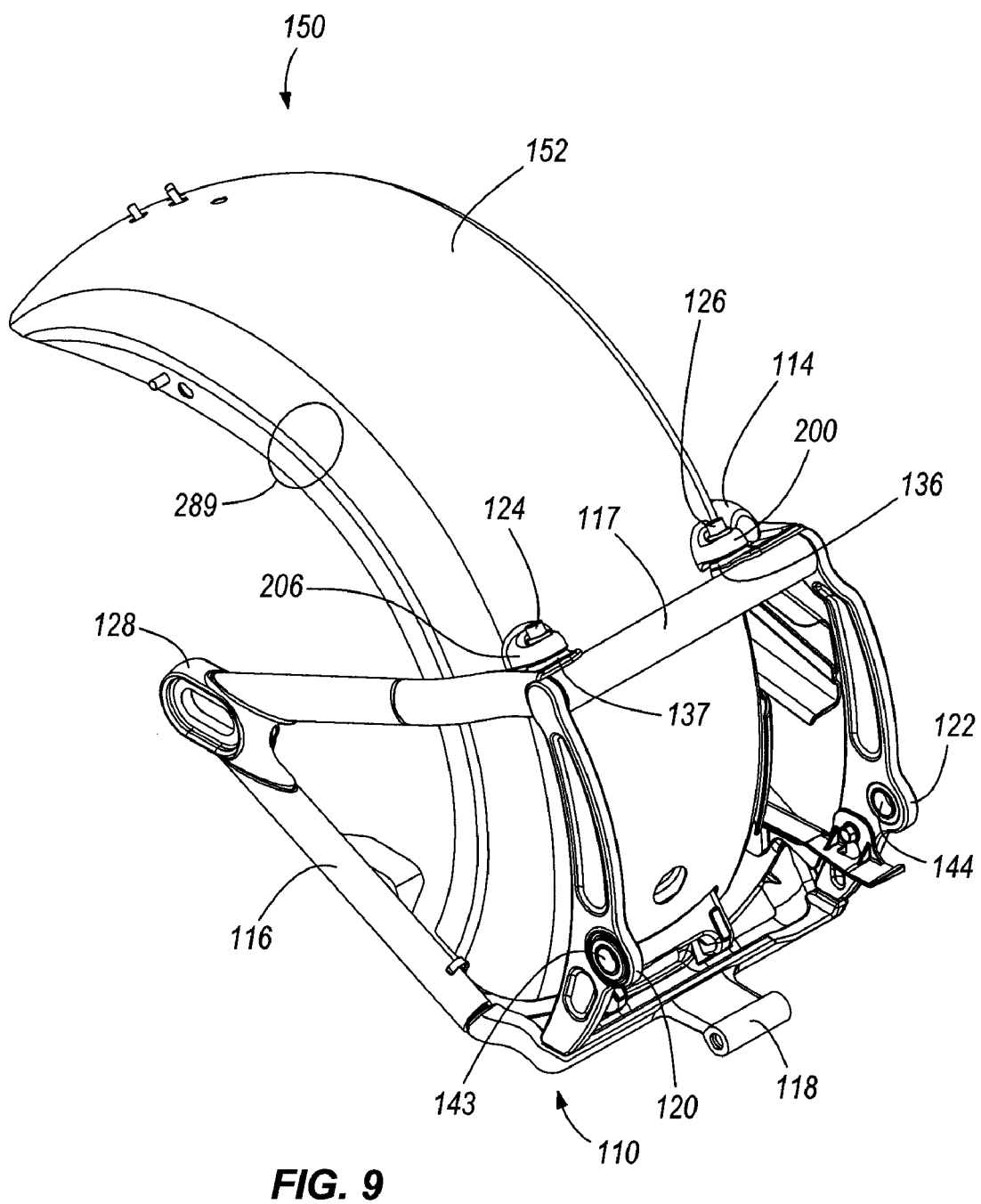
FIG. 9 is a third perspective view of the rear fender assembly attached to the swing arm assembly.

As described above, both the upper protrusions 202, 208 and the lower protrusion 222 are coupled to the swing arm assembly 110. The swing arm assembly 110 is fixedly rotatably connected with the rear wheel 108 and includes a left v-shaped support bracket 114 which is connected with a right v-shaped support bracket 116 through a lower bracket 118 and an upper bracket 117. Both v-shaped support brackets 114, 116 are connected with the rear wheel 108 through respective wheel mounts 130, 128. Each wheel mount 130, 128 forms an opening through which a fastener (not shown) is placed through and fastens the wheel mount 130,128 to the rear wheel 108. Preferably, the v-shaped support brackets 114, 116 are of tubular construction and formed from a metal, such as steel, iron, stainless steel, chrome, nickel, aluminum, titanium, or a compound of metals. The lower bracket 118 is connected with the upper bracket 117 through a pair of side members 120, 122 each of which is connected to a respective end of the upper and lower brackets 117, 118, as shown in FIG. 9. The side members 120, 122 provide additional rigidity and support to the overall swing arm assembly 110. Each side member 120, 122 forms an opening 143, 144 through which a fastener (not shown) is placed through for fastening the swing arm assembly 110 to the frame of the motorcycle 100. The swing arm assembly 110 is movably connected to the frame of the motorcycle 100 through a set of shocks (not shown) which dampen the motion of the swing arm assembly 110.

The rear fender assembly 150 is assembled as follows. First, the outer fender 152 is stamped from a sheet of metal, as shown in FIG. 2. Upon pressing the outer fender 152, openings 158, 160 are formed in the outer fender 152. The openings 158, 160 may be formed concurrently when the outer fender 152 is stamped from the sheet of metal. The inner fender 170 is also formed by stamping from a sheet of metal, as shown in FIG. 2. Upon pressing the inner fender 170, opening 176 is formed in the inner fender 170. The opening 176 may be formed concurrently when the inner fender 170 is stamped from the sheet of metal. Upon forming the outer and inner fenders 152, 170, the upper brackets 200, 206 and the lower bracket 220 are formed, preferably, by die casting.

Figure 16:
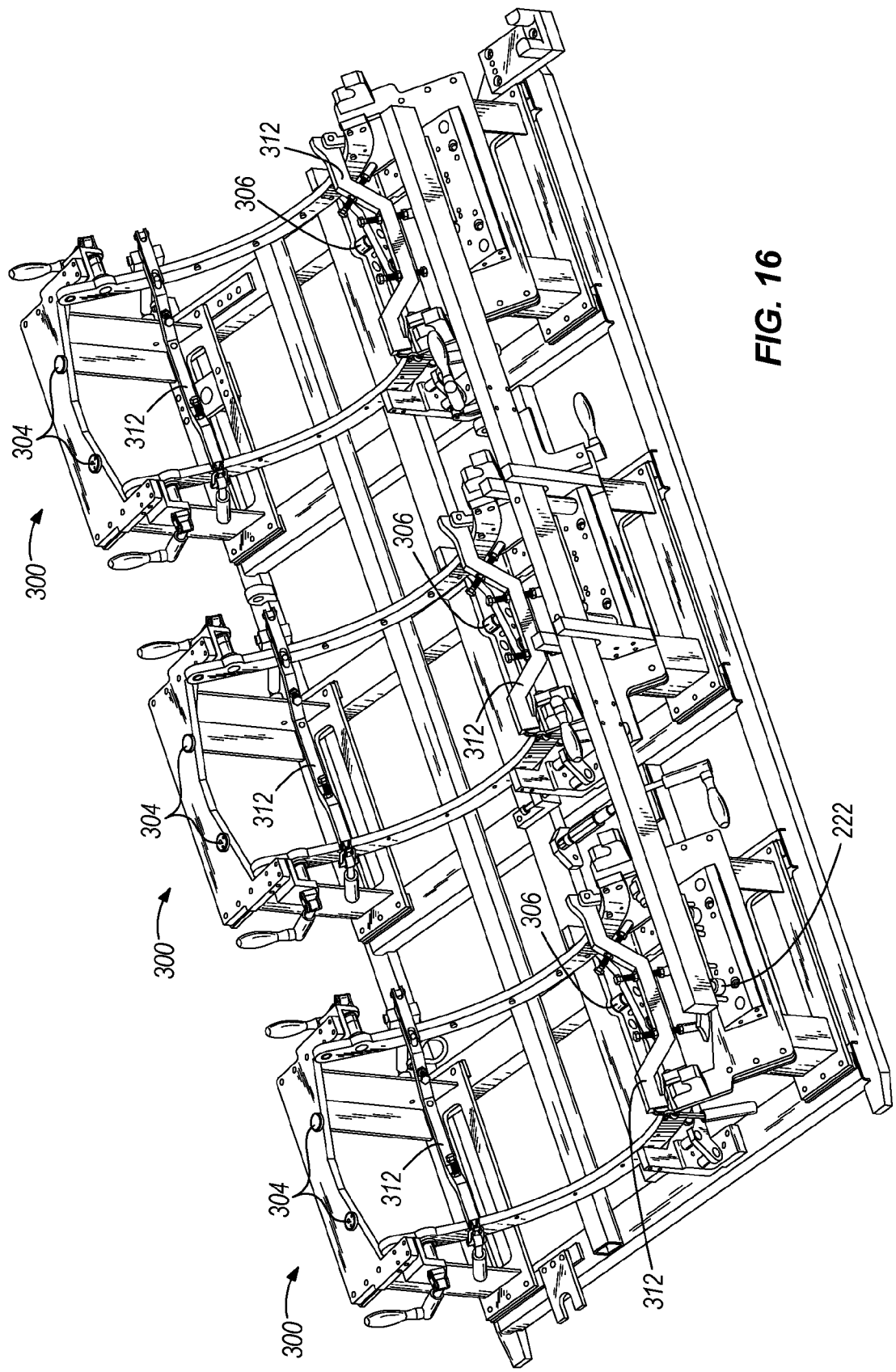
FIG. 16 is a front perspective view of an alignment fixture used in the assembly of the rear fender assembly of FIG. 2.
Figure 17:
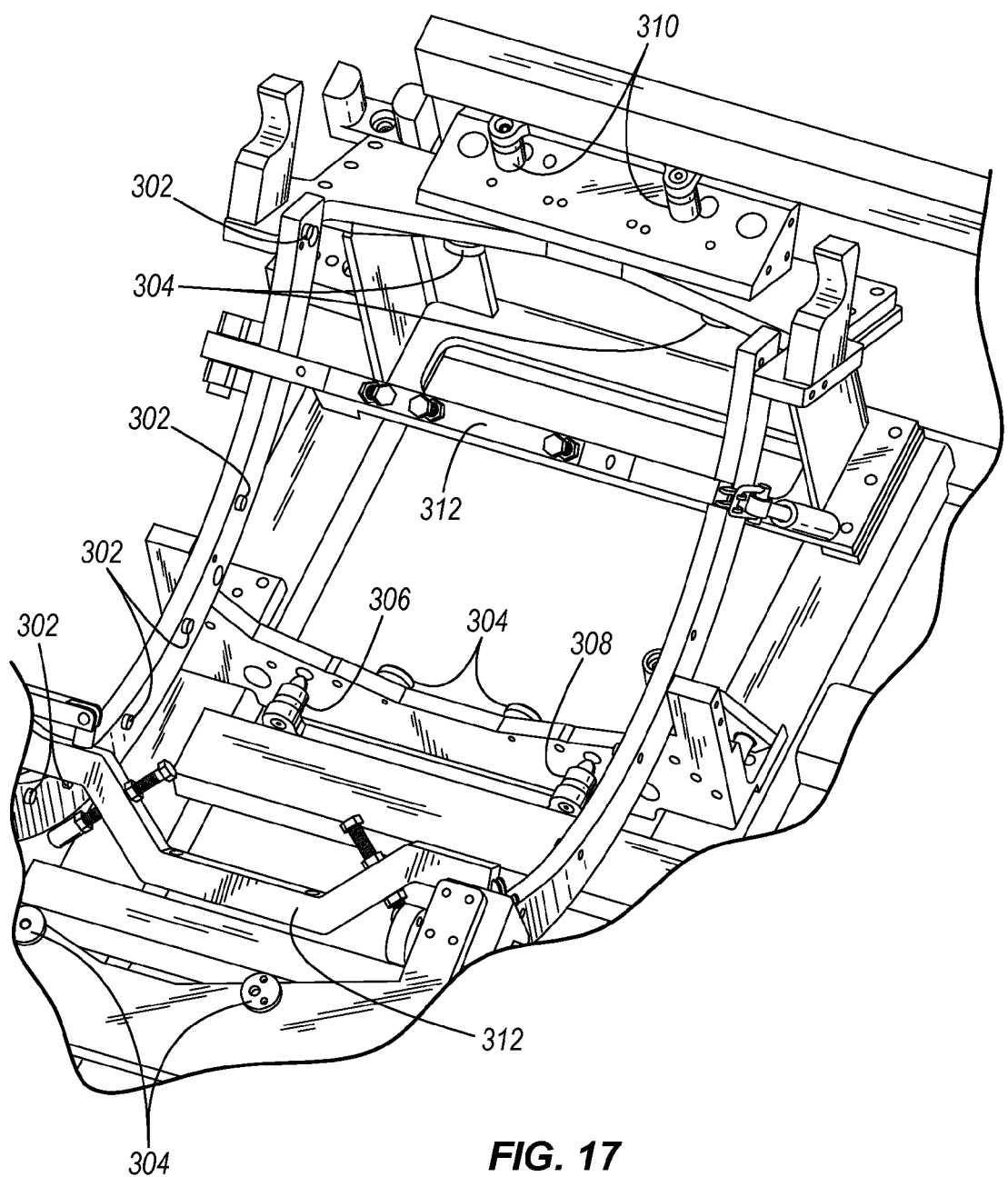
FIG. 17 is an enlarged rear perspective view of the alignment fixture of FIG. 16.

An alignment fixture 300 as shown in FIGS. 16 and 17 is used to assemble the rear fender assembly 150. The outer fender 152 is placed upside down into the fixture 300 such that the outer surface 154 contacts guide members 302, 304 of the fixture 300. Once properly seated against the guide members 302, 304, the inner surface 156 is coated with the bonding agent and the upper brackets 200, 206 are positioned through apertures 158, 160 such that the protrusions 202 and 208 are exposed on the bottom side of the outer fender 152. Also, the lower bracket 220 is positioned through the aperture 162 such that the protrusions 222 are exposed outside of the outer fender 152. After the brackets 200, 206, 220 are seated, the fixture 300 is manipulated to couple the protrusions 202, 208 with mating fastening mechanisms 306, 308 and to coupled the protrusions 222 with mating fastening mechanisms 310. The brackets 200, 206, 220 are free to be moved and adjusted so that they mate with the alignment fixture 300 in order to insure precise alignment. Next, the outer surface 172 of the inner fender 170 is coated with bonding agent and then placed upside-down on top of the outer fender 152 and brackets 200, 206, 220. The inner fender 170 is then pressed against the outer fender 152 through the use of pressure members 312. Heat is then applied to the rear fender assembly 150 while the rear fender assembly 150 is secured within the fixture 300 in order to more rapidly cure the bonding agent. By forming the rear fender assembly 150 in this manner using the above-described sandwich construction and bonding agent, the rear fender assembly 150 is provided with increased structural rigidity at a reduced weight.

In this manner, the bottom surfaces 205, 207 of each upper bracket 200, 206 are fixedly connected with the outer surface 172 of the inner fender 170, and the top surfaces 201, 203 of each upper bracket 200, 206 are fixedly connected with the inner surface 156 of the outer fender 152. Additionally, the bottom surface 223 of the lower bracket 220 is fixedly connected with the outer surface 172 of the inner fender 170, and the top surface 221 of the lower bracket 220 is fixedly connected with the inner surface 156 of the outer fender 152. Preferably, the brackets 200, 206, 220 are bonded to both the outer and inner fenders 152, 170 using a bonding agent such as an epoxy. Additionally, the outer fender 152 is fixedly connected, preferably through a bonding agent, to the inner fender 170. Upon forming the rear fender assembly 150, the rear fender assembly 150 is then mated to the swing arm assembly 110 by connecting the protrusions 202, 208, 222 with corresponding protrusion 136, 137, 139, 140 formed on the swing arm assembly 110, see FIGS. 9 and 10.

Figure 10:
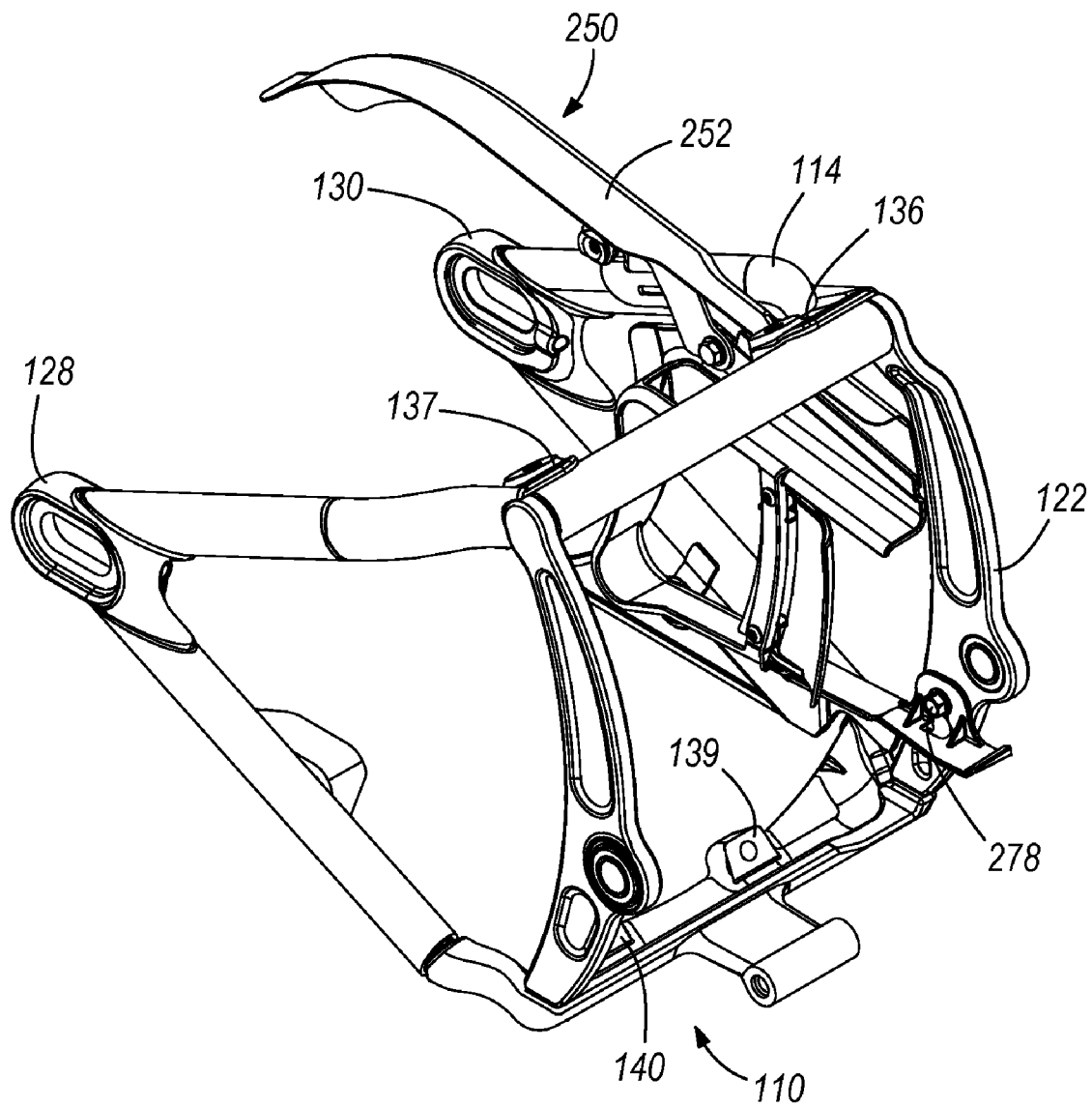
FIG. 10 is a perspective view of the swing arm assembly connected with a belt guard assembly.
Figure 13A:
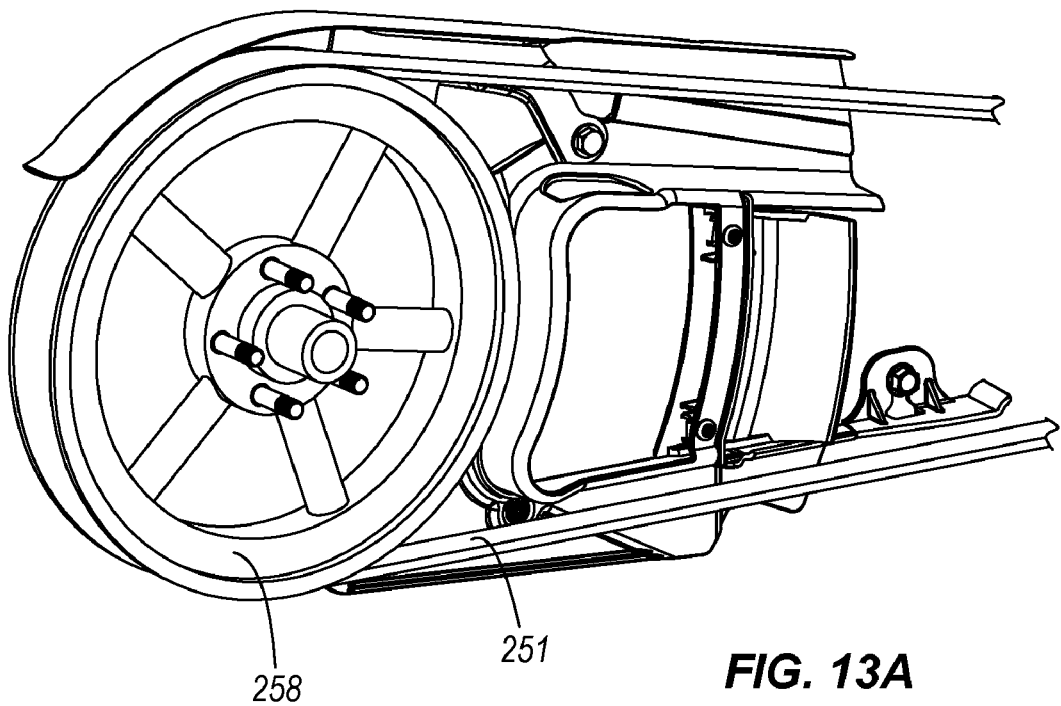
FIGS. 13A and B are opposing perspective view of the belt guard assembly.
Figure 13B:
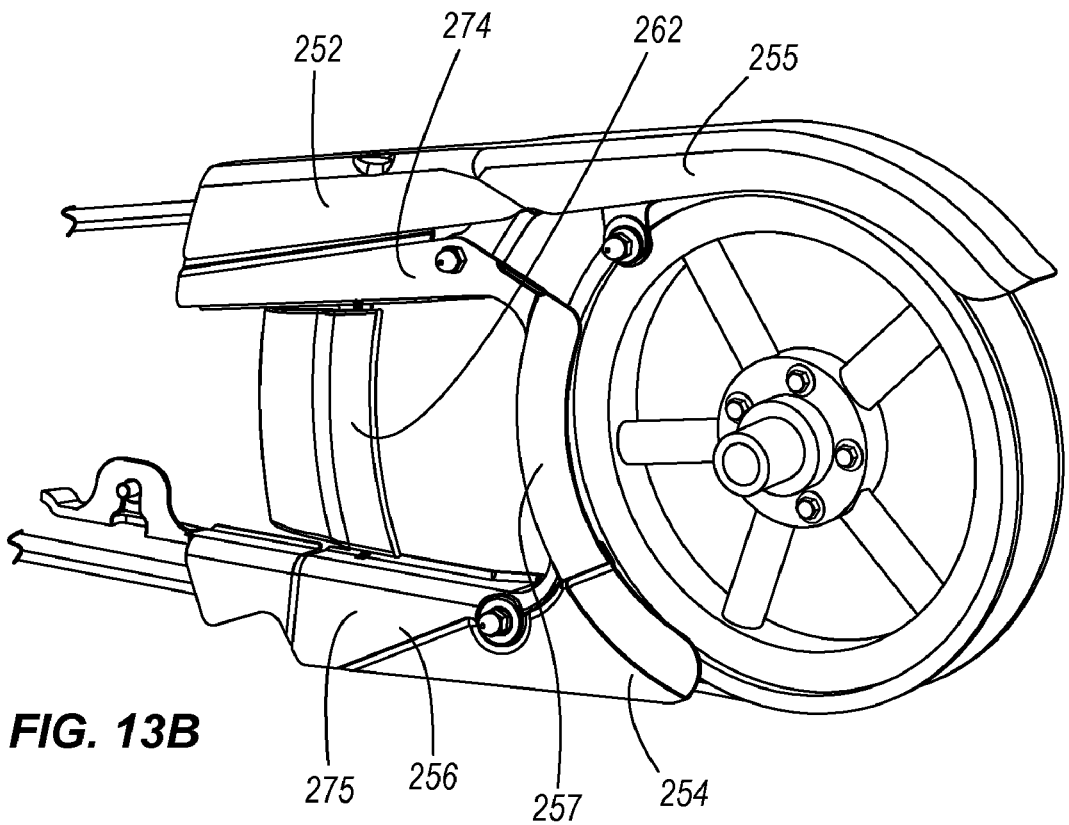

In one embodiment, a belt guard assembly 250 is connected with the swing arm assembly 110, as shown in FIG. 10. The belt guard assembly 250 covers a portion of a chain or belt 251, as shown in FIGS. 13A and 13B, in order to prevent the user of the motorcycle 100 and other foreign objects from coming into contact with the belt 251. Belt 251 connects the rear wheel 108 with the body of the motorcycle 100 and transfers power from the engine to the rear wheel 108.

Figure 11:
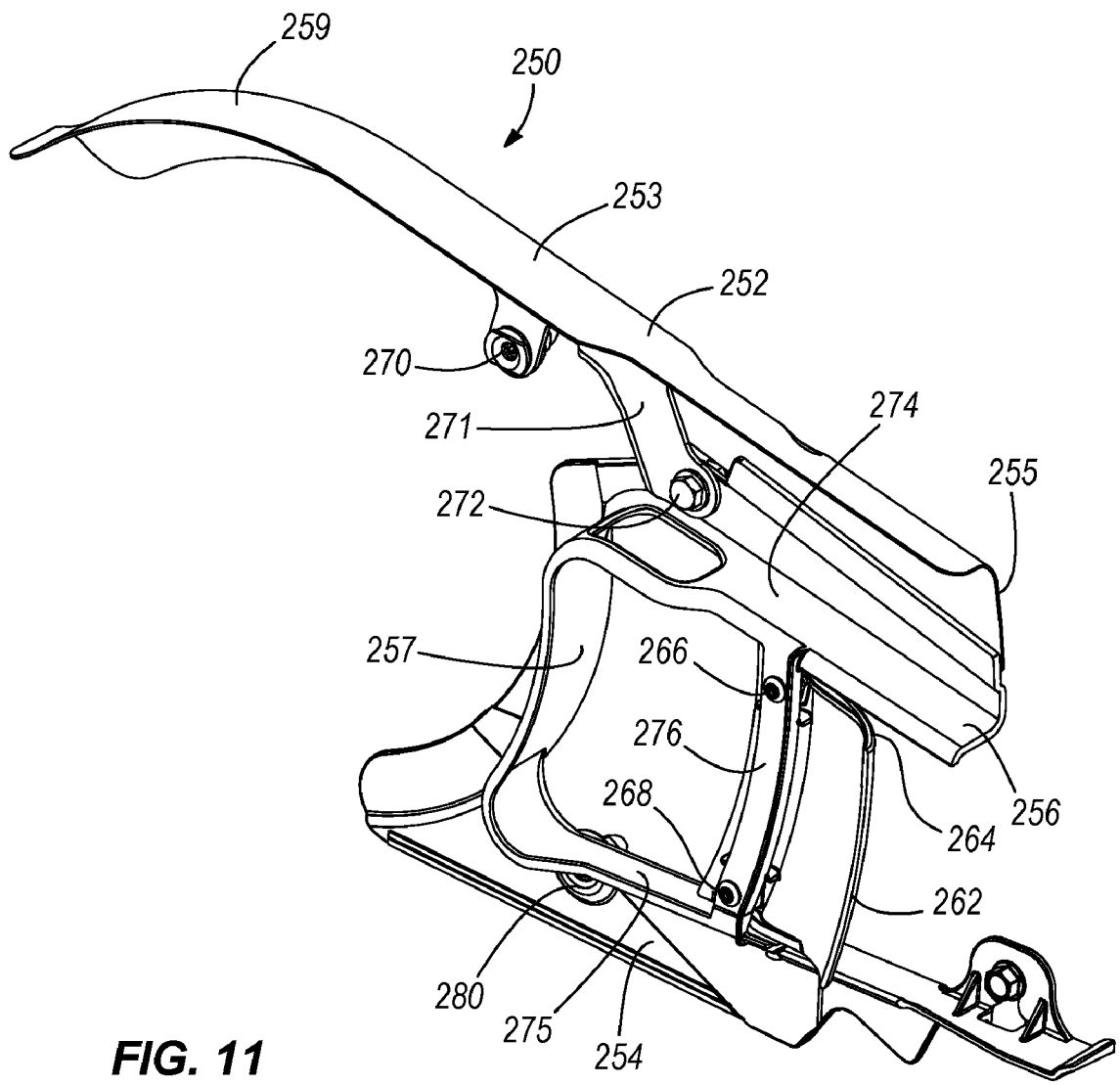
FIG. 11 is a perspective view of the belt guard assembly of FIG. 10.

The belt guard assembly 250 includes an upper belt guard 252, a lower belt guard 254 attached to the upper belt guard 252 through a connecting member 256, and a debris deflector 262 attached to the connecting member 256, as shown in FIGS. 10-13A, 13B. The upper belt guard 252 includes a top plate 253 having a curved end 259 connected with a side plate 255. The upper belt guard 252 is fastened to the connecting member 256 through a pair of fasteners 270, 272 and a linking member 271 which is fastened to both the upper belt guard 252 and the connecting member 256 with the fasteners 270, 272. The connecting member 256 is generally U-shaped and has a curved section 257 joining upper and lower sections 274, 275. The connecting member 256 also includes a support member 276 which also joins the upper and lower sections 274, 275, as shown in FIG. 11.

The lower section 275 of the connecting member 256 is fastened to the lower belt guard 254 using a fastener 280. The upper belt guard 252 and the upper section 274 of the connecting member 256 form a U-shaped channel through which the belt 251 travels. Additionally, the lower section 275 of the connecting member 256 and the lower belt guard 254 form an L-shaped channel through which the belt 251 travels. The curved section 257 curves around a portion of a rear sprocket 258 to which the belt 251 is connected. The rear sprocket 258 is connected with the rear wheel 108 of the motorcycle 100. The belt 251 rotates the rear sprocket 258, which in turn rotates the rear wheel 108 of the motorcycle 100, causing the motorcycle 100 to move in a forward direction. The belt guard assembly 250 is connected with the swing arm assembly 110 through a fastener 278 which connects the lower belt guard 254 to the side member 122, as shown in FIG. 10.

The debris deflector 262 is attached to the support member 276 through a pair of fasteners 266, 268. Fasteners 266, 268, 270, 272, 278, 280 may be any one of a number of fastening devices such as: mechanical fasteners such as screws, bolts, rivets, and solder; chemical fasteners such as epoxy or other types of glue; and by welding. The belt guard assembly 250 and any component within the belt guard assembly 250 may be manufactured from a metal, such as steel, iron, stainless steel, chrome, nickel, aluminum, titanium, or a compound of metals. The debris deflector 262 forms a profile 264 which mirrors or mimics at least a portion of a profile 289 for the rear fender assembly 150 mounted above the upper belt guard 252. The profile 289 is a portion of either the left or right side of the rear fender assembly 150 and preferably includes either the left or right side ridge 164, 166.

Figure 12:
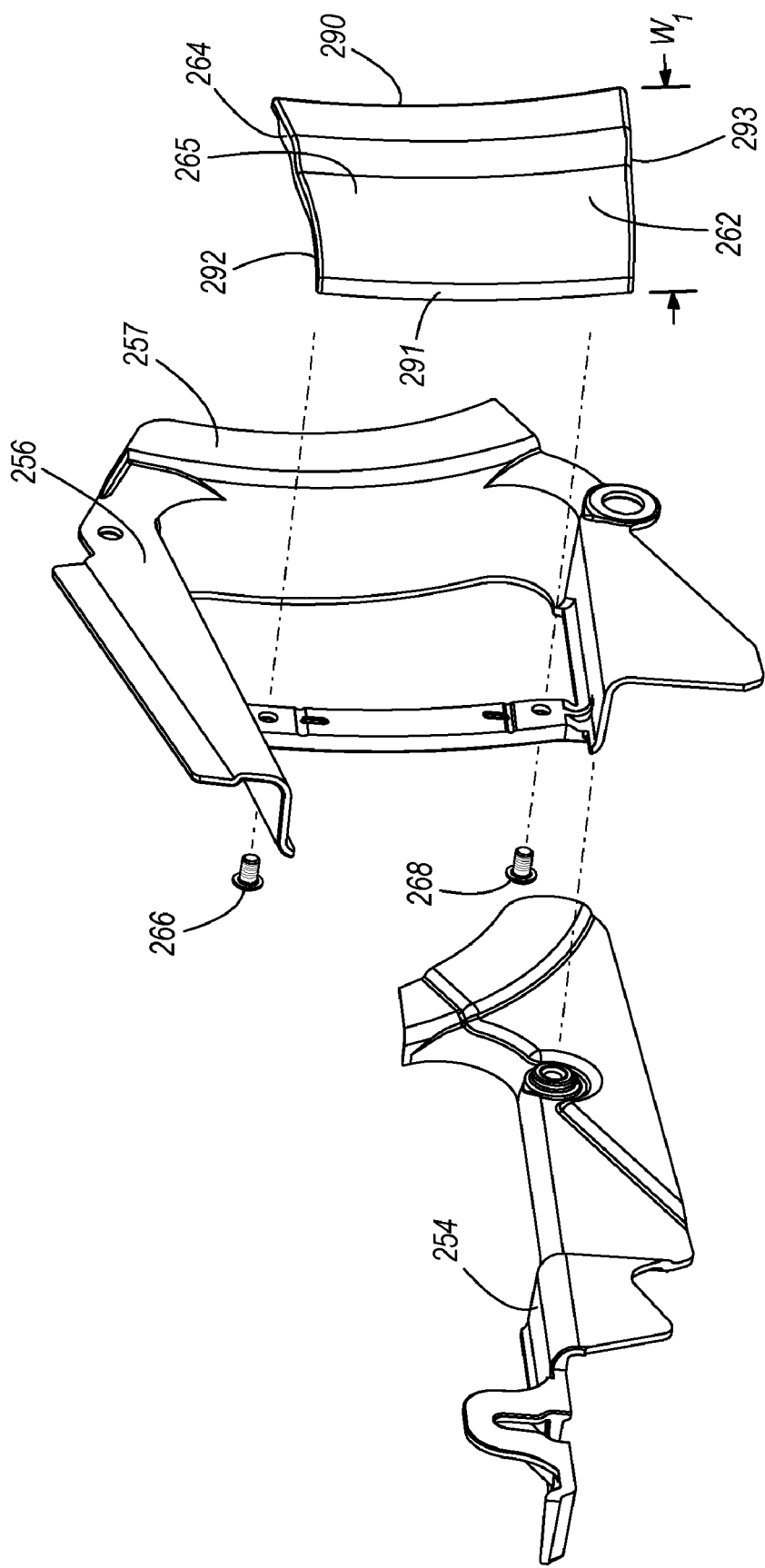
FIG. 12 is an exploded perspective view of the belt guard assembly.
Figure 14:
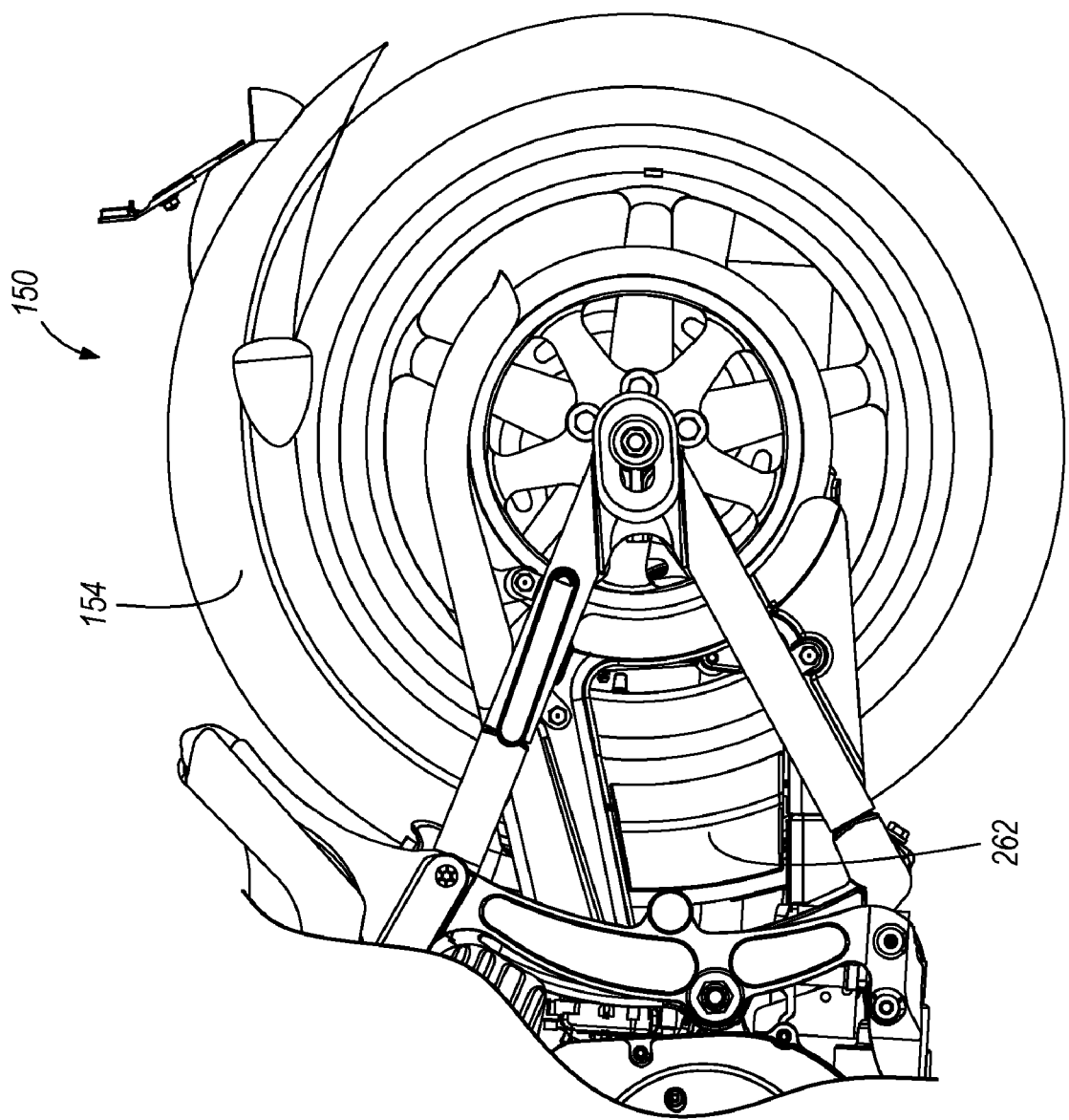
FIG. 14 is a side view of the belt guard assembly and the rear fender assembly of FIGS. 2 and 10.

The debris deflector 262 forms a ridge 265 which lines up with and mimics either the left or right side ridge 164, 166. The debris deflector 262 has a width $W_1$ which is the distance from a first edge 290 to a second edge 291 of the debris deflector 262, wherein the first and second edges 290, 291 both travel in a direction from the upper belt guard 252 to the lower belt guard 254, and the first edge 290 is adjacent the curved section 257, as shown in FIGS. 11 and 12. The left side edge of the outer fender 152 also has a width $W_2$, as shown in FIG. 2. $W_1$ is between 60 to 100% of $W_2$. In some constructions, $W_1$ is between 80 to 100% of $W_2$. The debris deflector 262 includes a top edge 292 opposed to a bottom edge 293, as shown in FIG. 12. The top edge 292 of the debris deflector 262 abuts the upper section 274 of the connecting member 256 and the bottom edge 293 of the debris deflector 262 abuts the lower section 275 of the connecting member 256. The top and bottom edges 292, 293 are no more than 3 mm from the upper and lower section 274, 275, respectively. In this manner, by mimicking at least a portion of the profile 289, the debris deflector 262 gives the appearance that the left side of rear fender assembly 150 continues down through the belt guard assembly 250. In addition, to further accentuate this visual impression, the debris deflector 262 can match the texture, finish, and/or color of the outer surface 154 of the fender assembly 150 (FIG. 14).

As will be appreciated by those of skill in this art, the preceding examples are provided, not to limit or define the scope of the present invention, but to illustrate the nature of the present invention and possible uses for the teachings of the present invention. These examples may be modified in many different ways while still obtaining the benefits of the teachings of the present invention. While the invention has been described and illustrated, this description is by way of example only. Additional advantages will occur readily to those skilled in the art, who may make numerous changes without departing from the true spirit and scope of the invention. Therefore, the invention is not limited to the specific details, representative machines, and illustrated examples in this description. Accordingly, the scope of this invention is to be limited only as necessitated by the accompanying claims. Various features and advantages of the invention are set forth in the following claims.

What is claimed is:

1. A rear fender assembly for a vehicle comprising:
   an outer fender having a generally U-shaped cross section and an inner surface;
   an inner fender having a generally U-shaped cross section and an outer surface connected with the inner surface of the outer fender, wherein a pair of stiffening protrusions are formed in the inner fender to protrude from the outer surface and define a wire routing path between the inner fender and the outer fender;
   a bracket having a portion sandwiched between the outer fender and the inner fender, the sandwiched portion having a first surface bonded to the inner surface of the outer fender and a second surface bonded to the outer surface of the inner fender; and
   a protrusion of the bracket extending from the sandwiched portion through a first opening defined by the outer fender.

2. The rear fender assembly of claim 1, wherein a top edge of both the outer and inner fenders follow an arc of a circle measuring at least 120°.

3. The rear fender assembly of claim 1, wherein the outer fender forms first and second arc-shaped ridges along left and right side edges of the outer fender.

4. The rear fender assembly of claim 1, wherein the bracket is an upper bracket and the protrusion is an upper protrusion, the rear fender assembly further comprising:
   a lower bracket having a portion sandwiched between the outer fender and the inner fender, the sandwiched portion of the lower bracket having a first surface bonded to the inner surface of the outer fender and a second surface bonded to the outer surface of the inner fender; and
   a lower protrusion extending from the sandwiched portion of the lower bracket through a second opening defined by the outer fender.

5. The rear fender assembly of claim 1, wherein the pair of stiffening protrusions are formed at a central portion of the inner fender.

6. The rear fender assembly of claim 5, wherein an additional pair of stiffening protrusions are formed at a lower end of the inner fender.

7. The rear fender assembly of claim 4 wherein the upper protrusion extends in a direction which is between 80° and 100° from a direction which the lower protrusion extends.

8. The rear fender assembly of claim 7, wherein the upper protrusion and the lower protrusion are adapted to be connected with a swing arm assembly of a vehicle.

9. A rear fender assembly for a vehicle comprising:
   an outer fender having an inner surface, a first opening being defined in the outer fender;
   an inner fender having an outer surface connected with the inner surface of the outer fender;
   a bracket having a portion sandwiched between the inner surface of the outer fender and the outer surface of the inner fender, the sandwiched portion extending generally along the inner surface of the outer fender and the outer surface of the inner fender in an area adjacent the first opening; and
   a protrusion which extends from the sandwiched portion through the first opening.

10. The rear fender assembly of claim 9, wherein a top edge of both the outer and inner fenders follow an arc of a circle measuring at least 120°.

11. The rear fender assembly of claim 9, wherein the outer fender forms first and second arc-shaped ridges along left and right side edges of the outer fender.

12. The rear fender assembly of claim 9, wherein the inner fender forms a first pair of stiffening protrusions at a lower end of the inner fender.

13. The rear fender assembly of claim 9, wherein the inner fender forms a second pair of stiffening protrusions at a central portion of the inner fender.

14. A vehicle comprising:
   a frame for supporting a rider and connecting a front wheel assembly with a rear wheel assembly;
   a swing arm assembly which is movably connected with the frame and fixedly connected with the rear wheel assembly, wherein the movement of the swing arm is damped via a shock absorber; and
   a rear fender assembly for covering a portion of the rear wheel assembly, the rear fender including
   an outer fender having an inner surface,
   an inner fender having an outer surface connected with the inner surface of the outer fender, and
   an upper bracket sandwiched between the inner surface of the outer fender and the outer surface of the inner fender, the upper bracket having an outer surface connected with the inner surface of the outer fender, wherein the upper bracket forms an upper protrusion which extends from the outer surface of the upper bracket through a first opening defined by the outer fender, and wherein the upper bracket is fixedly connected with the swing arm assembly.

* * * * *